Sept. 9, 1958 R. LUCIEN 2,851,059
ACCUMULATOR
Original Filed May 26, 1954
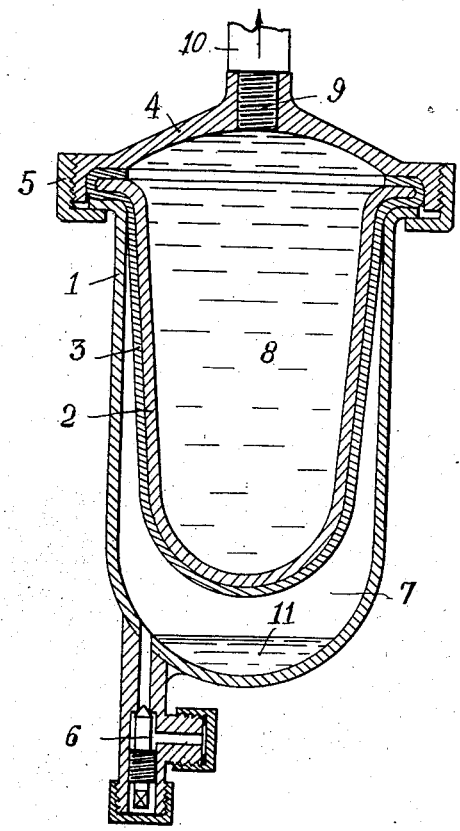

United States Patent Office 2,851,059
Patented Sept. 9, 1958

2,851,059
ACCUMULATOR

Rene Lucien, Paris, France, assignor to Societe d'Invention Aeronatiques et Mecaniques S. I. A. M., Fribourg, Switzerland, a corporation of Switzerland Original application May 26, 1954, Serial No. 432,578. Divided and this application October 17, 1955, Serial No. 540,926

Claims priority, application France December 18, 1953

3 Claims. (Cl. 138—30)

The present invention relates to compressed air accumulators of the type disclosed in my copending application Ser. No. 432,578 filed May 26, 1954, of which this application is a division.

Numerous kinds of compressed air accumulators are known, especially for use in hydro-pneumatic suspension systems. Said accumulators often comprise an elastic diaphragm dividing the inner space of the accumulator in two receptacles, one containing the compressed air and the other containing a liquid mass the volume of which may increase or decrease, for instance during the operation of the hydro-pneumatic suspension system fed by the accumulator. The normal duration of use for the said accumulators is generally shortened by the wear of the elastic diaphragm that poorly resists the repeated alternate stresses to which it is constantly subjected.

The invention has for its object a hydro-pneumatic accumulator with an elastic diaphragm, for instance of rubber, in which the diaphragm bears on a bell or the like, of a porous material, for instance of porous sintered metal, through which the passage of the liquid may take place when the latter is fed into the accumulator or escapes therefrom.

The movements of the diaphragm are thus limited between two end positions in which said diaphragm is respectively inflated or deflated. In its deflated condition, the diaphragm bears against the porous bell.

The appended drawing shows in longitudinal cross section, a hydro-pneumatic accumulator according to the invention.

This accumulator consists primarily of a fluid-tight outer receptacle 1 in the shape of an inverted bell, within which a further similarly shaped receptacle 2 is enclosed, which is wrapped in a rubber pouch 3. The accumulator is closed by a cover 4 with by means of a tightening ring screw 5.

The outer receptacle 1 is provided with a tail pipe closed by a valve 6 and through which air can be forced into the chamber 7 between the receptacle 1 and the pouch 3, while the space 8 within the inner receptacle is filled with oil and connected through an orifice 9 in the cover 4 with a pipe 10. In the bottom of the outer receptacle 1 there is a small amount of oil 11 the purpose of which is to adjust the amount of compressed air present in chamber 7. The porous receptacle 2 is pervious to the oil forced into chamber 8, so that upon the occurrence of pressure in the suspension system the liquid will inflate the elastic pouch 3 and consequently increase the pressure of the air present in chamber 7.

The small quantity of oil 11, at the bottom of the outer receptacle 1, is generally placed there once and for all, at the time when the accumulator is assembled. It has for its purpose to limit the space available in the receptacle 1 for expansion of the pouch 3, and it will be readily understood that the volume of available space is inversely proportional to the quantity of oil. Thus a larger quantity of oil defining a smaller expansion space will cause a more rapid increase of pressure for a same oscillation of the suspension, thereby hardening the shock absorbers. Consequently the small quantity of oil is a readily adjustable factor controlling the springiness of the suspension at a desired value.

What I claim is:

1. A hydro-pneumatic pressure accumulator, comprising a bell-shaped outer liquid-tight enclosure, a bell-shaped porous inner enclosure inside the outer enclosure and defining therewith a first pressure-tight chamber containing compressed air, an elastic pouch-shaped diaphragm surrounding the inner enclosure, the edges of the two enclosures and pouch being clamped together in sealing relationship, a cover sealing the outer enclosure to define a second pressure-tight chamber filled with liquid.

2. A hydro-pneumatic pressure accumulator according to claim 1, in which the bell-shaped inner enclosure is of sintered porous metal.

3. A hydro-pneumatic pressure accumulator according to claim 4, including a predetermined quantity of liquid in the first chamber for adjusting the volume thereof available for compressed air.

References Cited in the file of this patent

UNITED STATES PATENTS

| 2,337,771 | Roberts | Dec. 28, 1943 |
| 2,401,792 | Overbeke | June 11, 1946 |
| 2,501,773 | Johnson | Mar. 28, 1950 |
| 2,551,274 | MacDuff | May 1, 1951 |
| 2,583,231 | Ragland | Jan. 22, 1952 |
| 2,630,834 | Weber et al. | Mar. 10, 1953 |